United States Patent Office 3,197,467
Patented July 27, 1965

3,197,467
PROCESS FOR PREPARING 1,3-DIHYDRO-3-HY-
DROXY-2H-1,4-BENZODIAZEPIN-2-ONES
Stanley C. Bell, Philadelphia, Pa., assignor to American
Home Products Corporation, New York, N.Y., a corporation of Delaware
No Drawing. Filed Dec. 20, 1962, Ser. No. 247,460
7 Claims. (Cl. 260—239.3)

This invention is concerned with a novel process for preparing 1,3-dihydro-3-hydroxy-2H-1,4-benzodiazepin-2-ones from the corresponding 3-amino-1,3-dihydro-2H-1,4-benzodiazepin-2-ones.

The compounds produced by the novel process of this invention have valuable nervous system activity. These compounds have anti-convulsant and muscle-relaxing effects. Some of them exhibit sedative effects while others are tranquilizers without being sedative. Certain of them have useful disinhibiting effects and increase libido. The subject compounds are represented by the following general formula:

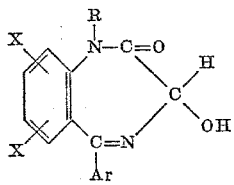

(I)

wherein R is hydrogen or lower alkyl, lower alkenyl, or lower aralkyl; Ar is phenyl, thienyl or phenyl substituted by a halogen, lower alkoxy, lower alkyl or haloalkyl substituent; X and Y represent hydrogen, or a halogen, nitro, haloalkyl, or alkylsulfonyl substituent. Compounds falling within the indicated scope are disclosed and claimed in copending application Ser. No. 177,174, filed March 5, 1962, and now abandoned.

The starting materials for the novel process of this invention, the preparation of which is described hereinbelow, are represented by the following formula:

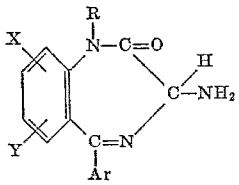

(II)

wherein X, Y, R and Ar are as above defined.

In accordance with the present invention, it has unexpectedly been discovered that products having Formula I, above, may be formed by the action of nitrous acid on the amine represented by Formula II. Nitrous acid is produced by adding portionwise any of several reagents to an acid reaction medium. Sodium nitrite, potassium nitrite, or organic nitrites may be added to a solution comprising an organic solvent or a mixture of organic solvents and water containing the amine starting compound and excess acid. The nitrite may be added in the form of a solid or as an aqueous solution, preferably having a concentration of around 5%. Acids which may be used to acidify the reaction medium include mineral acids such as hydrochloric acid; phosphoric acid or organic acids such as trichloroacetic acid. To dissolve the starting compound, the acid solution is heated to a temperature of 10° C. to 80° C. During the addition of nitrite to the acid solution, the reaction mixture is preferably maintained at a temperature of around 50° C.

The end products of the invention conventionally may be esterified at the 3-position with monocarboxylic acid moieties. They may also be reacted with a polycarboxylic acid esterifying agent to form pharmaceutically valuable 1,3-dihydro-5-aryl-3-carboxyacyloxy - 2H - 1,4 - benzodiazepin-2-ones, as disclosed and claimed in copending application Ser. No. 230,283, filed October 12, 1962.

The starting compounds, i.e., the 3-amino-1,3-dihydro-2H-1,4-benzodiazepin-2-ones, are readily prepared by the method described in copending patent application Serial No. 187,983, filed April 16, 1962. Said method consists essentially in aminating a 5-aryl-3-halo-1,3-dihydro-2H-1,4-benzodiazepin with ammonia dissolved in a suitable solvent such as ethylene glycol dimethyl ether. This reaction is preferably carried out at room temperature using an excess of ammonia. The reaction mixture is filtered and the filtrate is concentrated under vacuum to precipitate a residue which is dissolved in cold acetonitrile and treated with alcoholic hydrogen chloride to precipitate the starting material for this invention in the form of a hydrochloride salt. Prior to utilization in the instant process the above-obtained salt is dissolved in water and treated with dilute sodium carbonate solution to precipitate the free base.

The following examples illustrate the best mode of practicing the invention:

Example 1

To a warm solution of 1.0 g. of 3-amino-7-chloro-1,3-dihydro-5-phenyl-2H-1,4-benzodiazepin-2-one in 3 equivalents hydrochloric acid was added dropwise an aqueous 5% solution of sodium nitrite. The solid that precipitated out was filtered and recrystallized from alcohol giving 7-chloro-1,3-dihydro-3-hydroxy-5-phenyl-2H - 1,4 - benzodiazepin-2-one, M.P. 204–205° C.

Example 2

A solution of 1.0 g. of 3-amino-7-chloro-1,3-dihydro-5-phenyl-2H-1,4-benzodiazepin-2-one in hot ethanol was acidified with 2 equivalents of aqueous hydrochloric acid and treated with butyl nitrite. The solid that precipitated out was filtered and recrystallized from alcohol giving 7-chloro-1,3-dihydro-3-hydroxy-5-phenyl-2H - 1,4 - benzodiazepin-2-one, M.P. 204–205° C.

Using the procedures described above, but replacing 3-amino-7-chloro-1,3-dihydro-5-phenyl - 2H - 1,4 - benzodiazepin-2-one by 3-amino-7-chloro-1,3-dihydro-1 - methyl - 5 - phenyl - 2H-1,4-benzodiazepin-2-one,
3-amino-7-chloro-5-(o-chlorophenyl) - 1,3 - dihydro - 2H-1,4-benzodiazepin-2-one,
3-amino-7-chloro - 5 - (o-chlorophenyl) - 1,3 - dihydro - 1-methyl-2H-1,4-benzodiazepin-2-one,
1-allyl-3-amino-7-bromo-5 - (o-tolyl) - 1,3 - dihydro - 2H-1,4-benzodiazepin-2-one,
3-amino-1-benzyl - 7 - methylsulfonyl - 5 - (p - trifluoromethylphenyl)-1,3-dihydro-2H-1,1,4 - benzodiazepin-2-one,
3-amino-1,3-dihydro - 5 - (p - methoxyphenyl) - 7 - nitro-2H-1,4-benzodiazepin-2-one,
3-amino - 1,3 - dihydro - 1 - ethyl - 5 - (2-thienyl)-2H-1,4-benzodiazepin-2-one, and
3 - amino - 1,3 - dihydro - 5 - (m-fluorophenyl) - 2H - 1,4-benzodiazepin-2-one, and
3-amino-1,3-dihydro-5-(m-fluorophenyl) - 2H - 1,4-benzodiazepin-2-one, there are obtained:

7-chloro-1,3-dihydro-3 - hydroxy - 1 - methyl - 5 - phenyl-2H-1,4-benzodiazepin-2-one, M.P. 119–121° C., 7-chloro-5-(o-chlorophenyl) - 1,3 - dihydro - 3 - hydroxy-2H-1,4-benzodiazepin-2-one, M.P. 166–168° C., 7-chloro-5-(o-chlorophenyl) - 1,3 - dihydro - 3 - hydroxy-1-methyl-2H-1,4-benzodiazepin-2-one, M.P. 192–194° C., 1-allyl-7-bromo-3 - hydroxy - 5 - (o-tolyl) - 1,3 - dihydro-2H-1,4-benzodiazepin-2-one, 1-benzyl-3-hydroxy - 7 - methylsulfonyl - 5 - (p-trifluoromethylphenyl)-1,3-dihydro - 2H - 1,4 - benzodiazepin-2-one, 1-3-dihydro-3-hydroxy - 5 - (p-methoxyphenyl) - 7 - nitro-2H-1,4-benzodiazepin-2-one, 1,3-dihydro-1-ethyl-3-hydroxy - 5 - (2-thienyl) - 2H - 1,4-benzodiazepin-2-one, and 1,3-dihydro-3 - hydroxy - 5 - (m-fluorophenyl) - 2H - 1,4-benzodiazepin-2-one, respectively.

What is claimed is:

1. The process of which comprises:
    (1) dissolving in excess acid a 3-amino-1,3-dihydro-2H-1,4-benzodiazepin-2-one compound having the formula

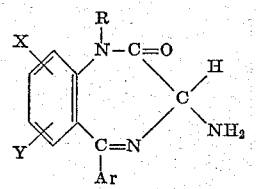

wherein R is selected from the group consisting of hydrogen, lower alkyl, lower alkenyl and lower aralkyl; Ar is selected from the group consisting of phenyl, thienyl and phenyl bearing a substituent selected from the group consisting of halogen, lower alkoxy, lower alkyl and lower haloalkyl; X and Y each represent hydrogen, halogen, nitro, haloalkyl and alkylsulfonyl;
    (2) adding a nitrite to the thus formed solution and;
    (3) recovering from the reaction mixture a 1,3-dihydro-3-hydroxy-2H-1,4-benzodiazepin - 2 - one, having the formula:

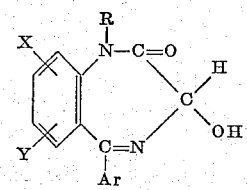

wherein X, Y, Ar and R are as above stated.

2. The process of claim 1, wherein said step (1) is effected by heating said solution at a temperature ranging from about 10° C. to about 80° C.

3. The process of claim 1, wherein said mineral acid is hydrochloric acid.

4. The process of claim 1, wherein said nitrite is butyl nitrite.

5. The process of claim 1, wherein said step (2) is carried out at a temperature of around 50° C.

6. The process which comprises adding portionwise an aqueous solution of sodium nitrite to a warm solution containing 3-amino-7-chloro-1, 3-dihydro-5-phenyl-2H-1,4-benzodiazepin-2-one in an excess of hydrochloric acid and recovering 7-chloro-1,3-dihydro-3-hydroxy-5-phenyl-2H-1,4-benzodiazepin-2-one.

7. The process which comprises dissolving 3-amino-7-chloro-1,3-dihydro-5-phenyl-2H-1,4-benzodiazepin - 2-one in ethanol; adding excess acid to the resulting solution; adding butyl nitrite to the acid solution and recovering 7-chloro-1,3-dihydro-3-hydroxy - 5 - phenyl-2H-1,4-benzodiazepin-2-one.

References Cited by the Examiner

Elderfield: Heterocyclic Compounds, vol. 6 (New York, 1957), page 278.

Hickinbottom: Reactions of Organic Compounds (London, 1948), pages 312–316.

Noller: Chemistry of Organic Compounds (Philadelphia, 1957), pages 110, 238–239, and 493.

NICHOLAS S. RIZZO, *Primary Examiner.*

UNITED STATES PATENT OFFICE
CERTIFICATE OF CORRECTION

Patent No. 3,197,467                                      July 27, 1965

Stanley C. Bell

It is hereby certified that error appears in the above numbered patent requiring correction and that the said Letters Patent should read as corrected below.

Column 1, formula (I) should appear as shown below instead of as in the patent:

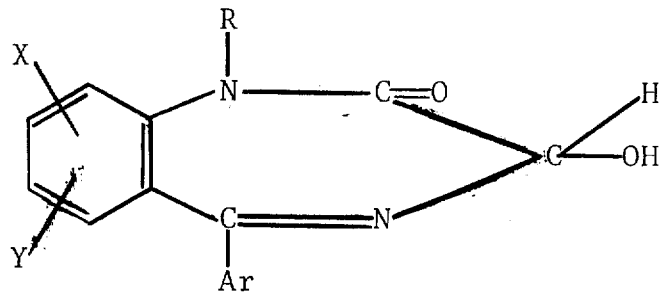

column 2, lines 67 and 68, strike out "3-amino-1,3-dihydro-5-(m-fluorophenyl)-2H-1,4-benzodiazepin-2-one, --.

Signed and sealed this 8th day of February 1966.

(SEAL)
Attest:

ERNEST W. SWIDER                               EDWARD J. BRENNER
Attesting Officer                               Commissioner of Patents